United States Patent Office 3,179,223
Patented Apr. 20, 1965

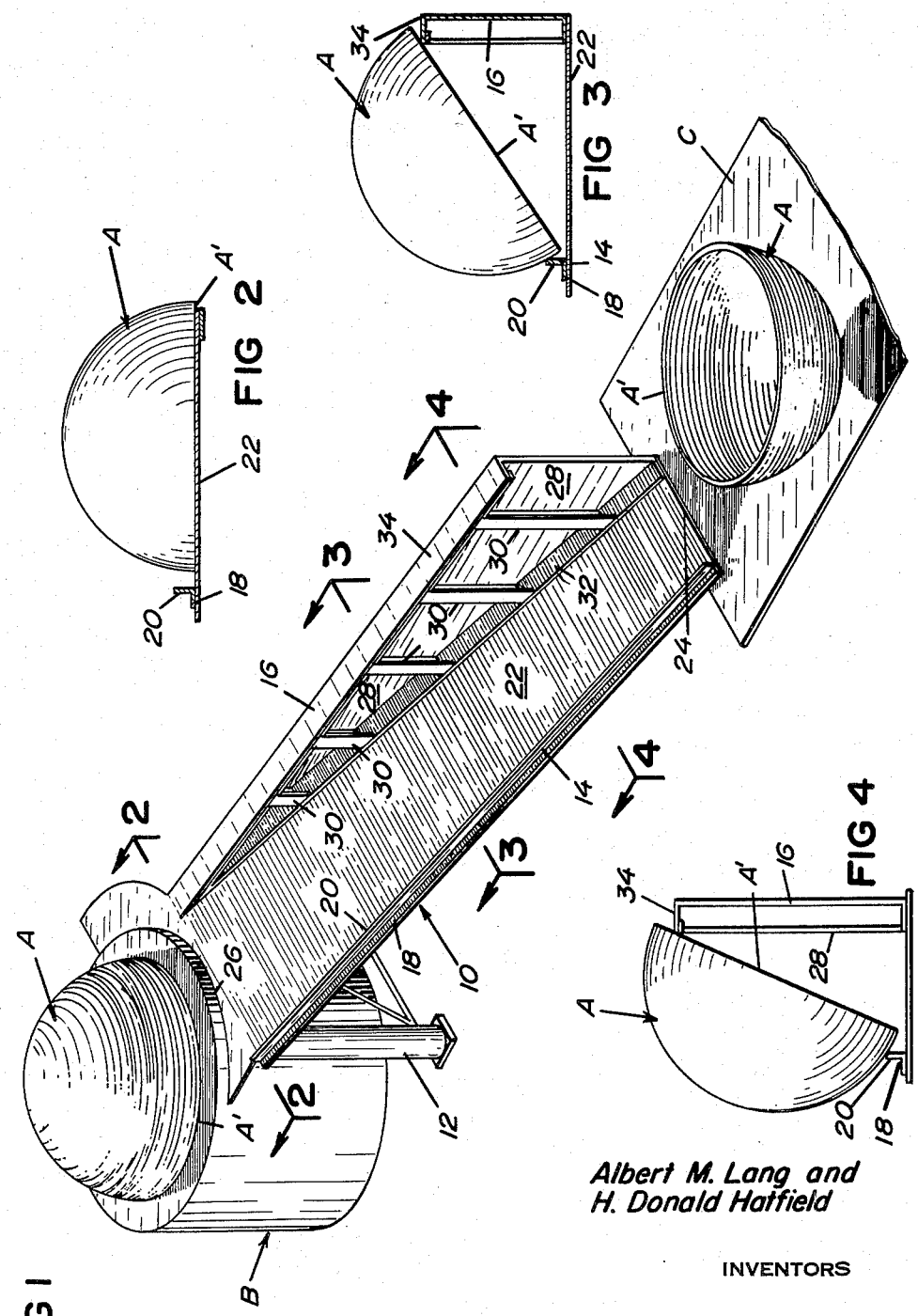

3,179,223
HEAD TURNING DEVICE
Albert M. Lang, Glenmoore, and Henry Donald Hatfield, Coatesville, Pa., assignors to Lukens Steel Company, Coatesville, Pa., a corporation of Pennsylvania
Filed Jan. 25, 1963, Ser. No. 253,877
1 Claim. (Cl. 193—43)

This invention relates to a device for inverting heads. Such heads are usually constructed of sheet metal which have been pressed to shape by a suitable press mechanism, forming, per se, no part of the present invention. However, after the pressing operation is completed and the heads have been shaped, they must be inverted and then conveyed to a different part of the plant for further operations or for storage.

Heretofore after the heads were pressed to shape they were manually turned to the inverted position mentioned above. This operation was a cumbersome one and had resulted in injuries to the feet of the workmen who performed the head turning operation.

The principal object of the invention is to provide a turning device or chute which automatically turns each head as it moves down the chute; the head being given a spiral movement by the contacting of its surfaces with the surfaces of the chute as it moves therealong.

Another object is to turn a head as it moves along a chute substantially 180° so that the head comes to rest with its semi-spherical portion resting on a support.

An additional object is to provide a completely automatic turning means for inverting a pressed head.

Yet another object is to provide a chute which is simple in its construction in that it consists of few parts for inverting heads as they slide along chutes thereof.

A further object is to provide a chute having one end located adjacent to a press and the other end located adjacent to a table or other supporting means.

Other objects will appear hereinafter throughout the specification.

In the drawings:

FIGURE 1 is a prospective view showing a preferred form of the head turning device having one of its ends located adjacent to a press and its opposite end located adjacent to a support;

FIGURE 2 is a vertical sectional view taken on the line 2—2 of FIGURE 1;

FIGURE 3 is a similar view taken on the line 3—3 of FIGURE 1; and

FIGURE 4 is a further similar view taken on the line 4—4 of FIGURE 1.

As will be noted from the drawings, the device comprises a chute 10 whose upper end may be supported by a pedestal 12, only one being shown.

The heads A are successively pressed into semi-spherical shape at the press part B which may be any conventional type. The lower end of the chute may rest upon a suitable support such as indicated diagrammatically at C.

The head turning device is provided with a side 14. The opposite side 16 is differently shaped from the side 14 as will be explained hereinafter.

Side 14 may consist of a metal angled member having horizontal flange 18 and vertical flange 20 as seen in the several figures. Other structure such as an I-beam, or other similar structure that will provide means whereby it may be welded as flange 18 is welded to the intervening or connecting central portion 22, may be employed. The vertical flange 20 also may comprise any suitable type of raised surface.

As will be noted from the drawings, the central portion 22 is principally for the purpose of maintaining the sides 14 and 16 in proper spaced relationship.

The side 16 may be equally spaced from side 14 along its length, but we prefer to construct the center portion so that its lower end 24 is of less width than its upper end 26 as shown in FIGURE 1, whereby the distance between the greaseways constituting the bent over portion 34 and flange 20 is more or less constant or slightly decreasing from top to bottom.

Referring again to side 16, this comprises two bent over portions 32 and 34 connected by a central body member 28, with transverse vertical reinforcing members 30 which may be L-shaped in cross-section. The reinforcing members are preferably welded to the bent over portions 32 and 34. The center portion 22 and the central body member 28 may be formed from a single sheet of metal or may be otherwise made integral such as by welding.

The angle of inclination to the horizontal of the central portion 22 and the side 14 may vary from say −30° to 40° depending upon the weight and size of the heads being handled by each individual head turning device. The angle of inclination to the horizontal of the bent over portion 34 varies from say −10° to 20° depending upon the weight and size of the heads being handled by the individual turning device. The important criteria is that the centers of gravity of the heads A be lower at the end of the greaseways than at the top, and that the heads be imparted sufficient velocity to keep them moving, and to flip them over.

After the heads have been formed, and assuming parts of the head turning device which are contacted by the head in its movements have been thoroughly greased or otherwise lubricated, the head is moved with its spherical portion uppermost so that its rim engages, or is in substantial engagement with flange 20. The head then moves down by gravity on the head turning device from the position shown in FIGURE 2, to the position shown in FIGURE 3, to the position shown in FIGURE 4, and finally to the position on table C shown in FIGURE 1. The edge A' rides on the bent over edge 34 whereon the semispherical areas slide along the upper edge of flange 20.

As the head moves downwardly in the chute it is subjected to a spiral or helical motion which may be said to be counterclockwise when viewing FIGURE 1. The spinning inertia of the head as it leaves will throw the head clear of the head turning device, and thus eliminate piling up of heads at the end 24 of the intervening central portion 22 of the chute.

It will be noted from the foregoing that the device is provided with no moving parts and all that is required is the shoving of the pressed head so that it starts down from the upper end whereby it rotates 180° in transit and is deposited on a suitable support—all without manual manipulation.

The above description and drawings disclose a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

We claim:

A turning device for semispheres comprising a chute inclined from the horizontal at an angle of about 30-40 degrees, said device having inclined sides bordering said chute, one side comprising a vertical retaining rim extending along the length of said chute, the second side comprising a triangle-shaped portion, the upper edge of said portion being inclined at a lesser angle to the horizontal than said chute, the distance between the rim and said upper edge being less than the diameter of the semispheres whereby semispheres are moved by gravity to slide down the chute with the edges of the semispheres supported by said rim and the upper edge of said portion and the semispheres are inverted at the bottom of the chute to rest on their curved surfaces.

References Cited by the Examiner
UNITED STATES PATENTS

| | | |
|---|---|---|
| 2,160,237 | 5/39 | Thompson. |
| 2,337,394 | 10/41 | Kok. |
| 2,400,419 | 5/46 | Hohl et al. |

SAMUEL F. COLEMAN, *Primary Examiner.*

ANDRES H. NIELSEN, *Examiner.*